Feb. 7, 1961  J. F. FINNEGAN  2,970,865
SUCTION NOZZLE FOR PNEUMATIC GRAIN CONVEYOR
Filed Sept. 17, 1959
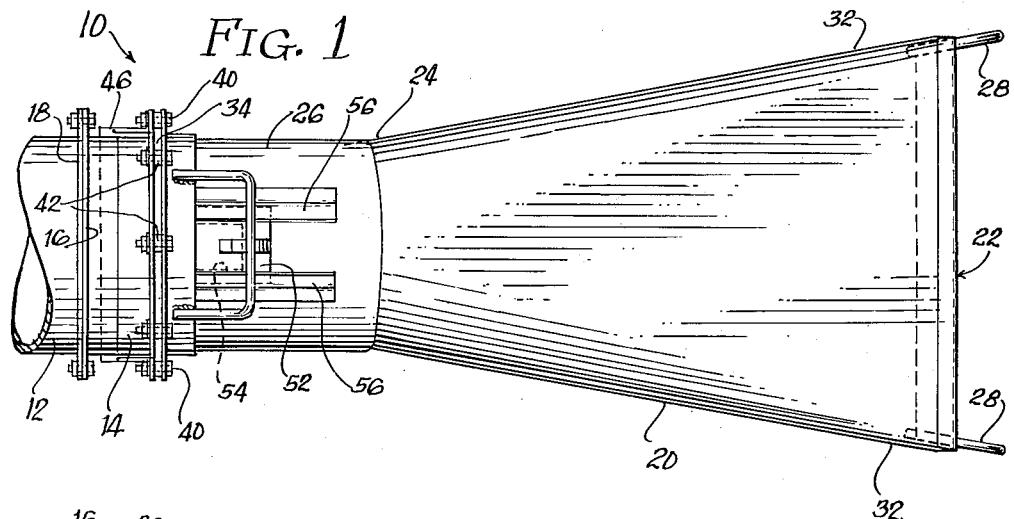
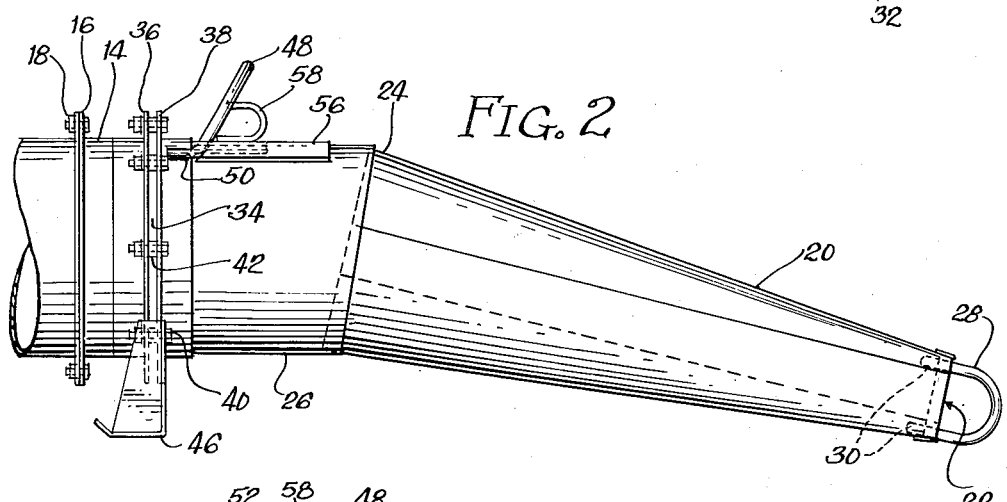
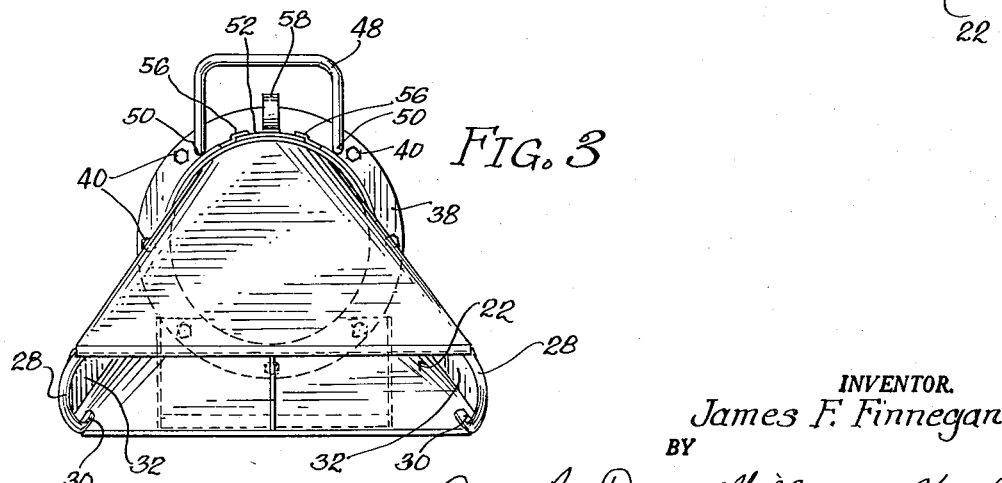
INVENTOR.
James F. Finnegan
BY
Ooms, McDougall, Williams & Hersh
Attorneys

United States Patent Office 2,970,865
Patented Feb. 7, 1961

2,970,865

SUCTION NOZZLE FOR PNEUMATIC GRAIN CONVEYOR

James F. Finnegan, Aurora, Ill., assignor, by mesne assignments, to DK Manufacturing Company, Chicago, Ill., a corporation of Illinois Filed Sept. 17, 1959, Ser. No. 840,717

1 Claim. (Cl. 302—58)

This invention relates to pneumatic conveyors adapted to carry grain or other granular material in a stream of air.

One principal object of the present invention is to provide a new and improved suction nozzle for a pneumatic conveyor, the nozzle being adapted to suck up the grain or other granular material by utilizing the vacuum produced by the pneumatic conveyor.

A further object is to provide a new and improved suction nozzle of the foregoing character, which is formed with an annular slot or opening for bleeding atmospheric air into the nozzle, so as to facilitate the taking up and carrying away of the grain by the nozzle.

Another object is to provide a new and improved suction nozzle in which the opening or slot, through which air is bled into the nozzle, extends entirely around the nozzle so that air will be introduced into the nozzle around a complete circle.

Another object is to provide a new and improved suction nozzle which is highly versatile, in that it is adapted to take up corn, wheat or virtually any other grain, without any substantial need for adjustments.

It is a further object to provide a new and improved suction nozzle which is constructed so that the amount of air bled into the nozzle can be adjusted to accommodate unusual conditions.

A further object is to provide a new and improved suction nozzle which is sturdy, easy to use and virtually foolproof, yet is remarkably simple in construction and low in cost.

Further objects and advantages of the present invention will appear from the following description, taken with the accompanying drawings, in which:

Fig. 1 is a top plan view of a suction nozzle to be described as an illustrative embodiment of the present invention.

Fig. 2 is a side elevational view of the nozzle shown in Fig. 1.

Fig. 3 is a front elevational view of the nozzle.

As already indicated, the drawings illustrate a suction nozzle 10 which may be used to suck up grain or other granular material, so that the granular material may be carried by a pneumatic conveyor machine. The pneumatic conveyor is not shown, but it may be of any known or suitable type adapted to suck up the granular material and carry it in an air stream to a desired point, which may be more or less remote from the point from which the grain is removed. It will be realized that such pneumatic conveyors are extremely useful for transferring grain from one point to another. Thus, a pneumatic conveyor of this type may be employed to transfer grain between a storehouse and a railroad car, ship, truck or other means of conveyance.

The illustrated nozzle 10 may be connected to the pneumatic conveyor by means of a flexible pipe or other conduit 12. The illustrated nozzle 10 has a generally cylindrical outlet portion 14, which is adapted to be connected to the pipe 12. Thus, the outlet portion 14 may be equipped with an outwardly projecting flange 16 which may be bolted or otherwise secured to a similar flange 18 on the pipe 12.

As shown, the nozzle 10 has a tubular inlet portion or member 20. A generally rectangular inlet opening 22 is formed at the outer end of the inlet member 20. At its inner end, the inlet member 20 has a portion 24 which is substantially circular in cross section. It will be seen that the inlet opening 22 is relatively flat and wide. Thus, the inlet opening 22 is wider in a horizontal direction than the portion 24, but is lower in height. It will be seen that the inlet member 20 of the nozzle tapers in vertical elevation between the portion 24 and the inlet opening 22. On the other hand, the inlet member 20 flares in horizontal width between the portion 24 and the opening 22, as shown to best advantage in Fig. 1.

The nozzle 10 preferably has a tubular intermediate portion or member 26 which is substantially cylindrical. The inner portion 24 of the inlet member 20 is secured to the outer end of the intermediate member 26. It will be seen from Fig. 2 that the inlet member 20 slopes downwardly at a small angle from the intermediate member 26.

At its outer end, the inlet member 20 preferbaly is provided with a pair of outwardly projecting guards or members 28 which keep the outer end of the nozzle from coming into direct engagement with any wall of the container from which the grain is to be taken. Thus, the guards 28 keep the outer end of the nozzle spaced away from any such wall, so that the inlet opening 22 will not be closed by engagement with such a wall. As shown, the guards 28 take the form of U-shaped members having legs 30 which are welded or otherwise secured to the side walls 32 of the inlet member 20.

The intermediate member 26 of the nozzle is preferably of substantially the same diameter as the outlet member 14. Moreover, the members 14 and 26 are axially aligned. However, provision is made for introducing or bleeding air into the nozzle 10 between the members 14 and 26. Normally, the nozzle is used by thrusting the outer end of the nozzle into a mass of grain or other granular material. Under these circumstances, it has been found that insufficient air enters the inlet opening 22 to carry off the grain in a proper manner. Thus, a virtually solid slug of grain tends to enter the inlet opening 22 from the mass of grain. By bleeding excess air into the nozzle, it has been found that the grain will be taken up and carried away much more efficiently In this case, a narrow annular slot or opening 34 is formed between the aligned cylindrical members 14 and 26 of the nozzle 10. Thus, air is bled into the nozzle through the opening 34 around the entire circular periphery of the nozzle. This arrangement has been found to be extremely efficient and versatile in taking up and carrying away the grain. With this arrangement, the nozzle may be used with both corn and wheat without any adjustments. Moreover, the nozzle may be employed with other types of grain.

As shown, the annular opening 34 is formed between outwardly projecting flanges 36 and 38 which are mounted on the cylindrical members 14 and 26. The flanges 36 and 38 are interconnected by means of bolts 40, or other fasteners, which extend through spacers 42 disposed between the flanges 36 and 38. The initial spacing between the flanges 36 and 38 is determined by the thickness of the spacers 42. The nozzle will seldom need adjustment. However, the spacing between the flanges 36 and 38 may readily be adjusted by using thinner or thicker spacers between the flanges. If the spacing between the flanges is increased, the amount of air bled into the nozzle will be increased. Conversely, the inflow of air will be decreased by decreasing the spacing between the flanges.

For convenience, a foot or stand 46 may be secured to the underside of the nozzle to support the nozzle above a floor or other supporting surface. As shown, the stand 46 is secured to the flange 38 by some of the same bolts 40 which are employed to connect the flange 38 to the flange 36.

In order that the nozzle 10 may be lifted and carried easily, the nozzle may be provided with a handle 48. In this case, the handle 48 takes the form of a U-shaped member having legs 50 which may be welded or otherwise secured to the upper portion of the intermediate member 26.

As already indicated, the nozzle will seldom need to be adjusted. However, under unusual conditions, it may be desirable to adjust the amount of air bled into the nozzle. For this purpose, the nozzle is provided with a door or gate 52, adapted to open and close an opening 54 in the intermediate member 26. As shown, the opening 54 is generally rectangular in shape and is formed in the upper portion of the intermediate member 26. The door 52 is adapted to slide along the top of the intermediate member 26 so as to open the opening 54 to any desired extent. It will be seen that the door 52 is guided by a pair of bars or plates 56 which are Z-shaped in cross section. The bar 56 may be welded or otherwise secured to the upper portion of the intermediate member 26. A convenient U-shaped handle 58 may be welded or otherwise secured to the door 52 so that it may easily be slid along between the bars 56.

In its normal use, the outer end of the nozzle 10 is thrust into a pile or other mass of grain. The suction generated by the pneumatic conveyor machine sucks the grain into the inlet opening 22. At the same time, excess air is drawn or bled into the nozzle through the annular slot or opening 34. The excess air greatly improves the efficiency with which the grain is taken up and carried away. With the arrangement of the present invention, the air is bled into the nozzle around a complete circle so that the air enters the nozzle from all directions. Thus, the air is effectively mixed with the grain so that the grain will become entrained in the air very quickly and easily. The introduction of the air all around the nozzle also has the important effect of centralizing the grain in the pipe, so that the grain tends to travel down the middle of the pipe. This greatly reduces the friction between the grain and the pipe.

It has been found that the nozzle of the present invention will operate efficiently with both corn and wheat, and also with most other grains. Thus, the nozzle seldom needs adjustment and is virtually universal in its application. There is no danger that the nozzle will be misadjusted to such an extent that it will not operate properly with any of the common grains.

Under unusual conditions, the amount of air bled into the nozzle may be adjusted by moving the door 52 to change the effective size of the opening 54. The initial adjustment of the nozzle is established by the thickness of the spacers 42. Of course, it is easy to change this adjustment by changing the spacers, although such readjustment will seldom be necessary. Besides being easy to use and virtually foolproof, it will be apparent that the nozzle is sturdy and extremely low in cost.

Various modifications, alternative constructions and equivalents may be employed without departing from the true spirit and scope of the invention, as exemplified in the foregoing description and defined in the following claim.

I claim:

In a suction nozzle for a pneumatic conveyor, the combination comprising a tubular inlet member having an inlet opening at its outer end, an intermediate member connected to the inner end of said inlet member, an outlet member aligned axially with said intermediate member, said outlet member and said intermediate member being generally cylindrical, said intermediate member having an opening therein, a door movable over said opening for adjusting the effective size thereof, a first flange projecting outwardly from the outer end of said outlet member, a second flange opposite said first flange and projecting outwardly from the inner end of said intermediate member, said flanges being spaced apart to form an annular opening between said outlet member and said intermediate member, said annular opening being adapted to bleed excess air into said nozzle, a plurality of spacers disposed between said flanges, and a plurality of fasteners extending through said flanges and said spacers to hold said flanges together in assembled relation.

References Cited in the file of this patent
FOREIGN PATENTS 153,110     Australia _____ Sept. 7, 1953